(12) United States Patent  (10) Patent No.: US 6,578,525 B2
Engelking et al.  (45) Date of Patent: Jun. 17, 2003

(54) BIRD PERCH APPARATUS

(76) Inventors: Margaret E. Engelking, 415 Stockton, San Antonio, TX (US) 78216; Georgia E. Lloyd, 415 Stockton, San Antonio, TX (US) 78216

( * ) Notice: Subject to any disclaimer, the term of this patent is extended or adjusted under 35 U.S.C. 154(b) by 0 days.

(21) Appl. No.: 10/008,508

(22) Filed: Nov. 8, 2001

(65) Prior Publication Data

US 2002/0124807 A1 Sep. 12, 2002

Related U.S. Application Data

(63) Continuation-in-part of application No. 09/802,572, filed on Mar. 9, 2001, now Pat. No. 6,457,439.

(51) Int. Cl.[7] ............................................... A01K 31/12
(52) U.S. Cl. ....................................................... 119/468
(58) Field of Search ................................ 119/468, 537, 119/708, 467, 716, 728, 57.8, 57.9, 533, 531, 702, 705; D30/119, 120

(56) References Cited

U.S. PATENT DOCUMENTS

| 276,392 | A | * | 4/1883 | Gregory | 119/468 |
|---|---|---|---|---|---|
| 1,180,595 | A | * | 4/1916 | Lydecker | 119/468 |
| 1,575,101 | A | * | 3/1926 | Edwards | 119/468 |
| 5,265,557 | A | * | 11/1993 | Lovitz | 119/468 |
| 5,299,528 | A | * | 4/1994 | Blankenship | 119/537 |
| 5,413,068 | A | * | 5/1995 | Segal | 119/468 |
| 5,474,025 | A | * | 12/1995 | Lee | 119/464 |
| 5,511,512 | A | * | 4/1996 | Pintavalli et al. | 119/468 |

FOREIGN PATENT DOCUMENTS

GB  1461276  * 1/1977  .......... A01K/31/12

* cited by examiner

Primary Examiner—Peter M Poon
Assistant Examiner—Son T. Nguyen
(74) Attorney, Agent, or Firm—Cline H. White; Jackson Walker L.L.P.

(57) ABSTRACT

The present invention relates to a bird cage, more particularly a bird cage in which a perch is rotatably suspended from a ceiling of the bird cage. An alternate preferred embodiment provides for a perch rotatably supported between the ceiling and a floor member of the bird cage. The perch is constructed so that it will rotate about two perpendicular axes.

20 Claims, 9 Drawing Sheets

BIRD PERCH APPARATUS

BACKGROUND OF THE INVENTION

This is a CIP of Application Ser. No. 09/802,572, filed Mar. 9, 2001, which issued as U.S. Pat. No. 6,457,439, on Oct. 1, 2002.

The present invention relates to bird perch apparatuses and more particularly pertains to a new bird perch apparatus for providing birds with an aerial toy that encourages climbing and swinging.

The use of bird perch apparatuses is known in the prior art. More specifically, bird perch apparatuses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,265,557; U.S. Pat. No. 2,707,936; U.S. Pat. No. 2,483,003; U.S. Pat. No. 1,180,595; U.S. Pat. No. 230,993; and U.S. Pat. No. Des. 386,834.

While these devices fulfill their respective, particular objectives and requirements, the aforementioned patents do not disclose a new bird perch apparatus. The inventive device includes a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion is coupled to the support assembly. The perch assembly has a pair of annular rings that are diametrically coupled to the mounting portion such that each of the annular rings is adapted for permitting perching of the bird.

In these respects, the bird perch apparatus according to the present invention substantially departs from the conventional concepts and designs of the prior art, and in so doing provides an apparatus primarily developed for the purpose of providing birds with an aerial toy that encourages climbing and swinging.

SUMMARY OF THE INVENTION

In view of the foregoing disadvantages inherent in the known types of bird perch apparatuses now present in the prior art, the present invention provides a new bird perch apparatus construction wherein the same can be utilized for providing birds with an aerial toy that encourages climbing and swinging.

The general purpose of the present invention, which will be described subsequently in greater detail, is to provide a new bird perch apparatus and method which has many of the advantages of the bird perch apparatuses mentioned heretofore and many novel features that results in a new bird perch apparatus which is not anticipated, rendered obvious, suggested, or even implied by any of the prior art bird perch apparatuses, either alone or in any combination thereof.

To attain this, the present invention generally comprises a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion coupled to the support assembly. The perch assembly has a pair of annular rings that are diametrically coupled to the mounting portion such that each of the annular rings is adapted for permitting perching of the bird.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bird perch apparatus and method which has many of the advantages of the bird perch apparatuses mentioned heretofore and many novel features that result in a new bird perch apparatus which is not anticipated, rendered obvious, suggested, or even implied by any of the prior art bird perch apparatuses, either alone or in any combination thereof.

It is another object of the present invention to provide a new bird perch apparatus, which may be easily and efficiently manufactured and marketed.

It is a further object of the present invention to provide a new bird perch apparatus, which is of a durable and reliable construction.

An even further object of the present invention is to provide a new bird perch apparatus which is susceptible of a low cost of manufacture with regard to both materials and labor, and which accordingly is then susceptible of low prices of sale to the consuming public, thereby making such bird perch apparatus economically available to the buying public.

Still yet another object of the present invention is to provide a new bird perch apparatus which provides in the apparatuses and methods of the prior art some of the advantages thereof, while simultaneously overcoming some of the disadvantages normally associated therewith.

Still another object of the present invention is to provide a new bird perch apparatus for providing birds with an aerial toy that encourages climbing and swinging.

Yet another object of the present invention is to provide a new bird perch apparatus which includes a mounting assembly is adapted to be coupled to a support structure. A support assembly is rotatably coupled to the mounting assembly. A perch assembly is rotatably coupled to the support assembly such that the perch assembly is adapted for permitting perching of the bird. The perch assembly has a mounting portion is coupled to the support assembly. The perch assembly has a pair of annular rings that are diametrically coupled to the mounting portion such that each of the annular rings is adapted for permitting perching of the bird.

Still yet another object of the present invention is to provide a new bird perch apparatus that would be easy to mount inside the cage and would provide the bird with a new way to entertain itself. Watching the bird frolic on the unit would also be entertaining for the bird owner.

Even still another object of the present invention is to provide a new bird perch apparatus that would be of durable construction and have additional attachments to further the birds' exercise and entertainment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
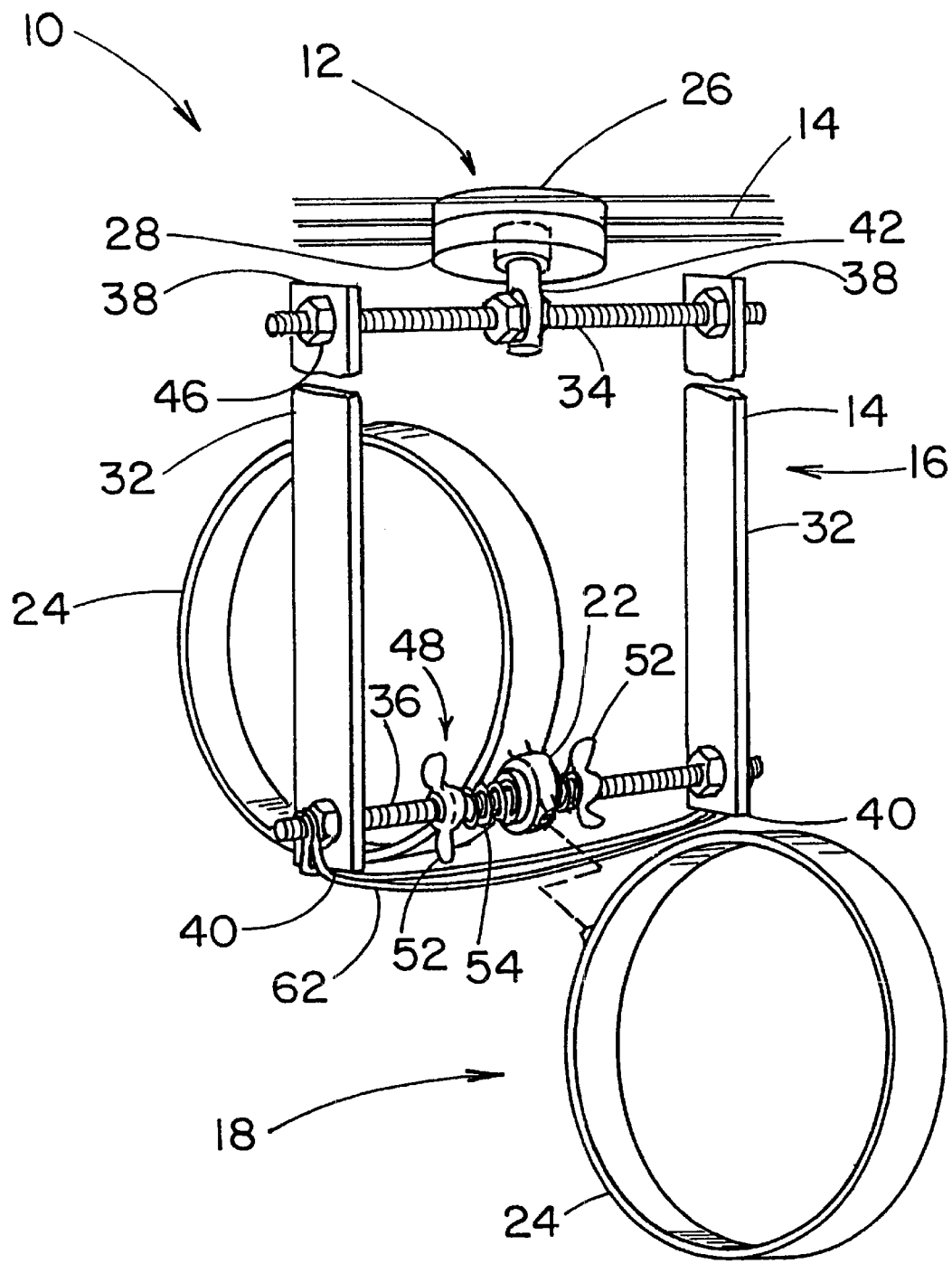
FIG. 1 is a perspective view of a new bird perch apparatus according to the present invention.
Figure 2:
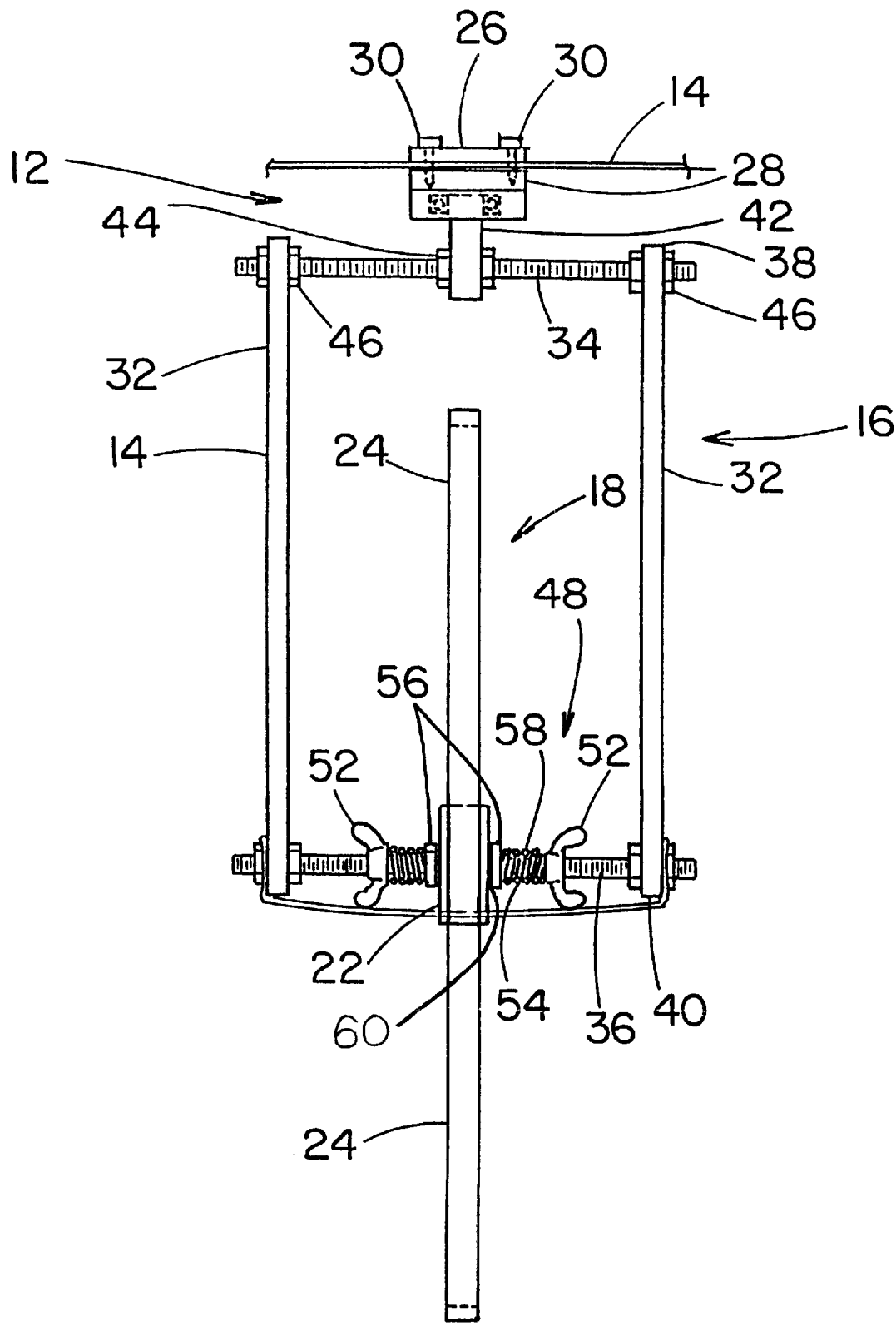
FIG. 2 is an end view of the present invention.
Figure 3:
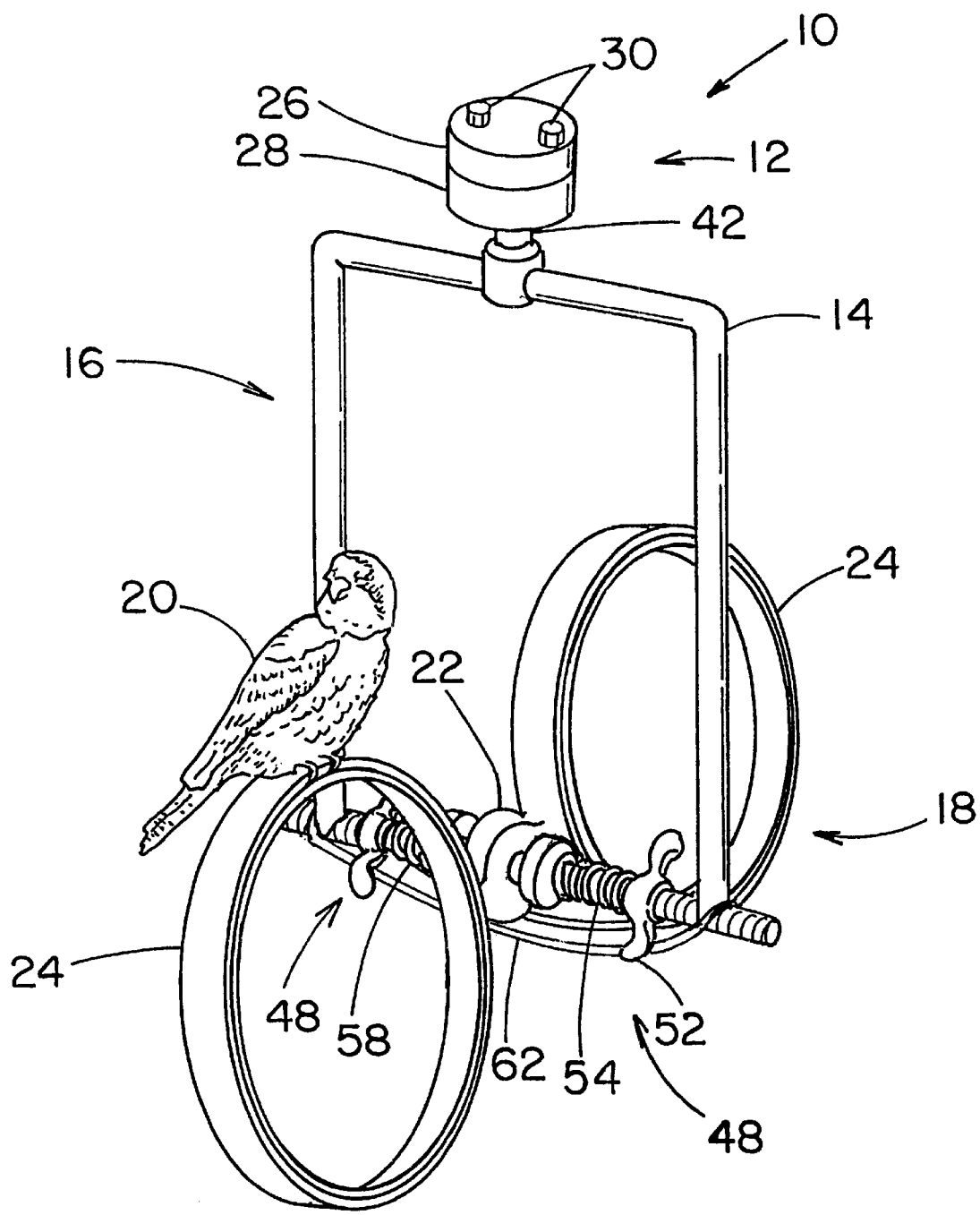
FIG. 3 is a perspective view of the present invention.
Figure 4:
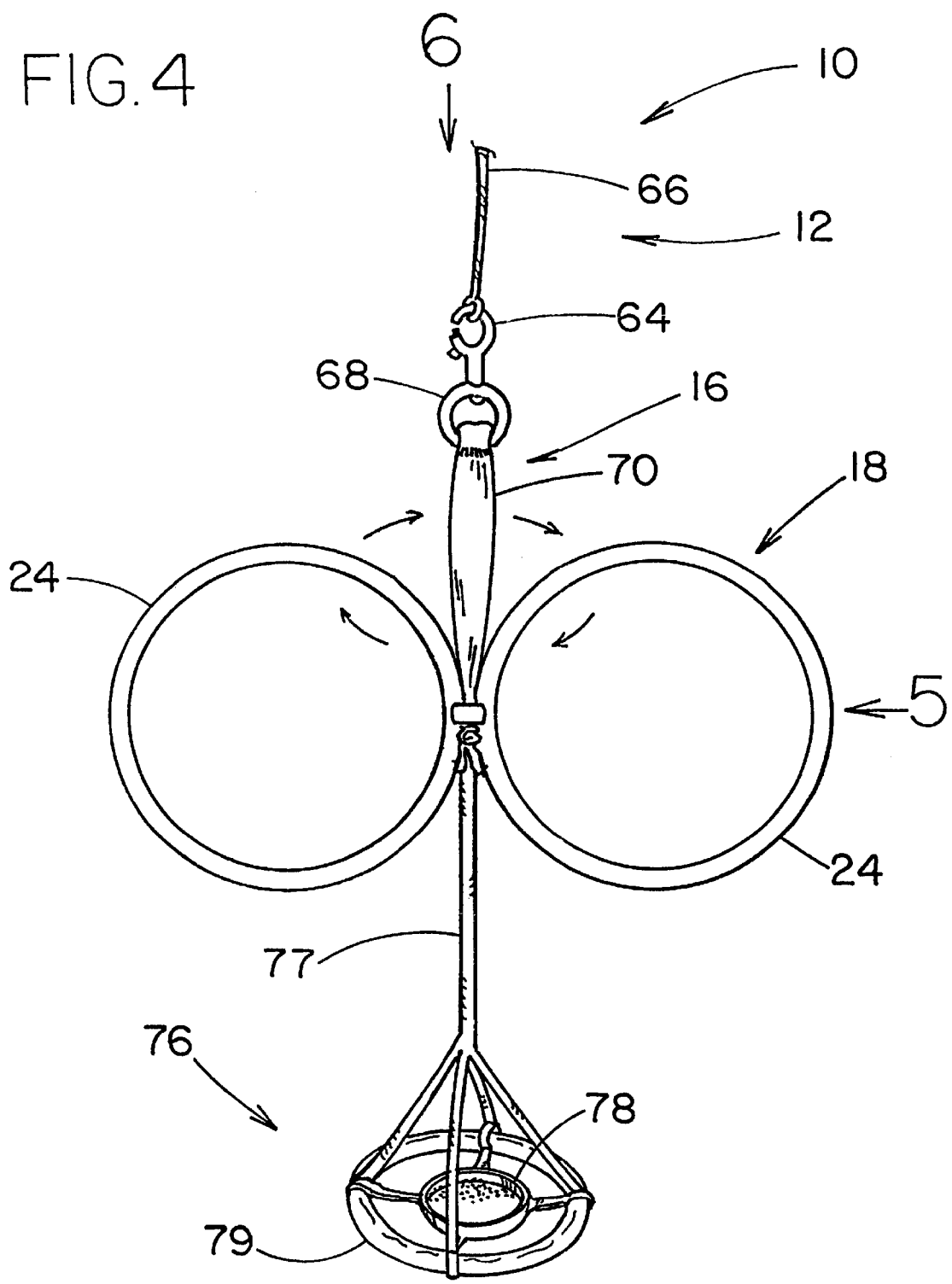
FIG. 4 is a side view of the present invention.
Figure 5:
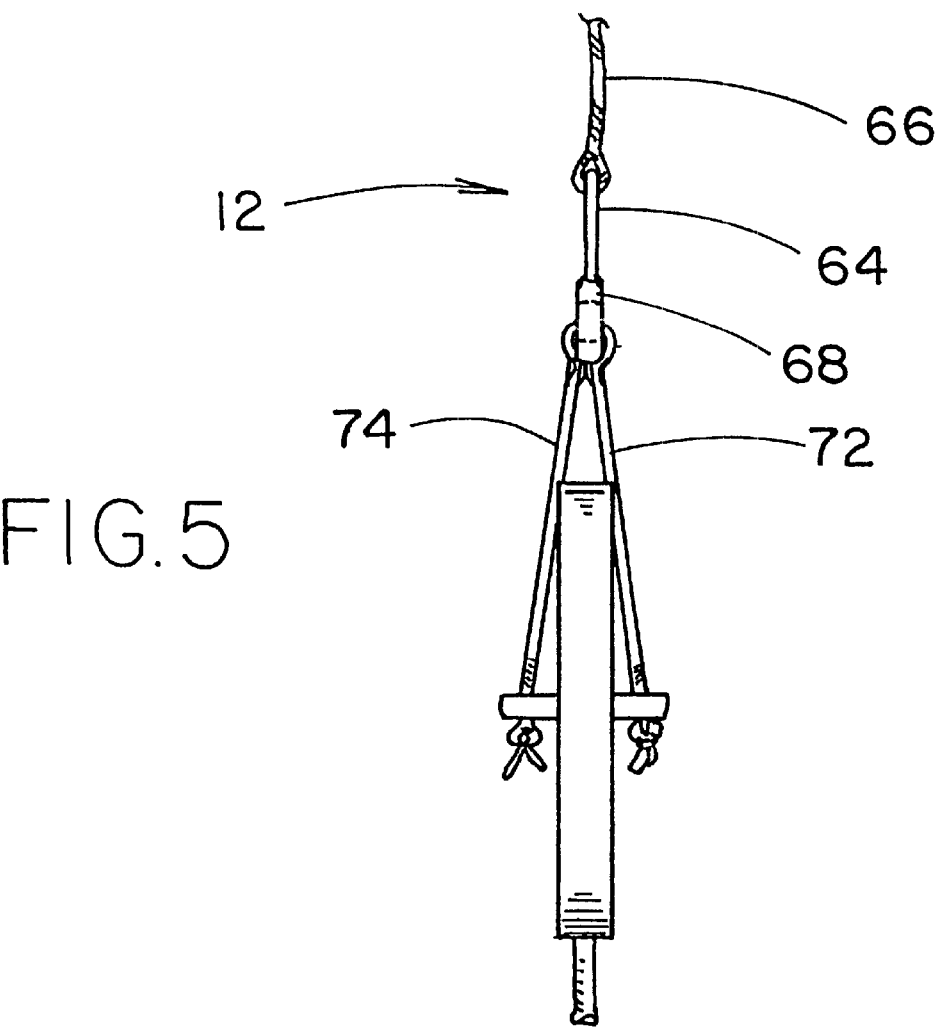
FIG. 5 is an end view of the present invention.
Figure 6:
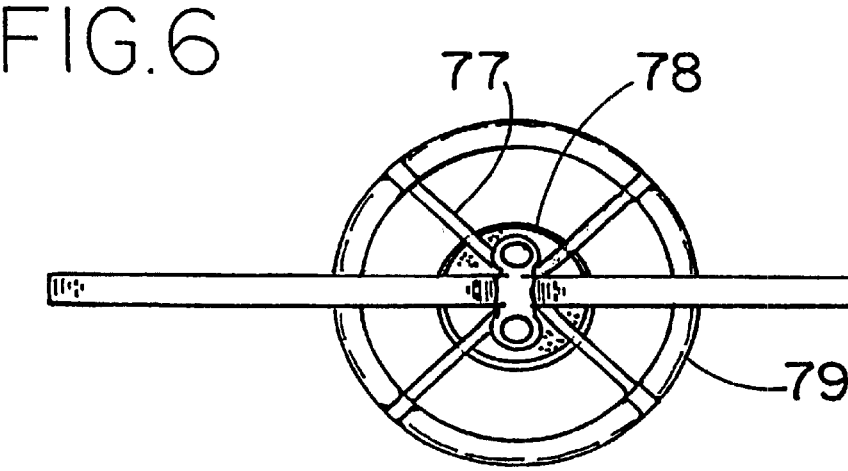
FIG. 6 is a side view of the present invention.

With reference now to the drawings, and in particular to FIGS. 1 through 6 thereof, a new bird perch apparatus embodying the principles and concepts of the present invention and generally designated by the reference numeral 10 will be described.

As best illustrated in FIGS. 1 through 6, the bird perch apparatus 10 generally includes a mounting assembly 12 that is adapted to be coupled to a support structure 14. A support assembly 16 is rotatably coupled to the mounting assembly 12. A perch assembly 18 is rotatably coupled to the support assembly 16 such that the perch assembly 18 is adapted for permitting perching of the bird 20. The perch assembly 18 has a mounting portion 22 is coupled to the support assembly 16. The perch assembly 18 has a pair of annular rings 24 that are diametrically coupled to the mounting portion 22 such that each of the annular rings 24 is adapted for permitting perching of the bird 20.

The mounting assembly 12 is adapted to be coupled to a cage. The mounting assembly 12 has an upper plate 26 and a lower plate 28 such that the upper plate 26 is adapted for being positioned outside of the cage and the lower plate 28 is adapted to be positioned inside of the cage proximate the upper plate 26. The upper plate 26 and the lower plate 28 is adapted for compressing the cage between the upper plate 26 and the lower plate 28 when the upper plate 26 is coupled to the lower plate 28 by a plurality of fasteners 30. (See FIG. 2)

The support assembly 16 has pair of sidebars 32, a first support member 34 and a second support member 36. The first support member 34 is coupled between a first end 38 of each of the sidebars 32, the second support member 36 is coupled between a second end 40 of each of the sidebars 32. The mounting portion 22 of the perch assembly 18 is rotatably coupled to the second support member 36 whereby the perch assembly 18 is rotatable between the sidebars 32.

A connecting bar 42 has a bore 44 such that the bore 44 of the connecting bar 42 received the first support member 34 whereby the connecting bar 42 is selectively positionable along a length of the first support member 34. The connecting bar 42 is rotatably coupled to the mounting assembly 12. (See FIG. 2)

The first support member 34 is threaded, a pair of threaded connectors 46 is engaged to the first support member 34 such that each of the pair of threaded connectors 46 are positioned on opposite sides of the connecting bar 42. The threaded connectors 46 are for maintaining the position of the connecting bar 42 relative to the first support member 34.

A pair of adjustment assemblies 48 for engaging the second support member 36 such that each of the adjustment assemblies 48 are for engaging opposite sides of the mounting portion 22 of the perch assembly 18. The adjustment assemblies 48 are for producing tension against the mounting portion 22 of the perch assembly 18 for controlling resistance to rotation of the annular rings 24 of the perch assembly 18 around the second support member 36 when the bird 20 lands on one of the annular rings 24. Each of the adjustment assemblies 48 includes a threaded coupler 52, a biasing member 54 and a washer 56. The washer 56 is positioned adjacent the mounting portion 22 of the perch assembly 18, the threaded coupler 52 is for threadably engaging the second support member 36 such that the biasing member 54 is positioned between the threaded coupler 52 and the washer 56. The threaded coupler 52 is positionable closer to the mounting portion 22 of the perch assembly 18 such that the biasing member 54 compresses the washer 56 against the mounting portion 22 of the perch assembly 18 for increasing resistance to rotation. The threaded coupler 52 is positionable away from the mounting portion 22 of the perch assembly 18 such that the biasing member 54 reduces compression against the washer 56 for decreasing resistance to rotation.

The washer 56 includes a friction enhancing material 60 such that when compression between the mounting portion 22 of the perch assembly 18 and the washer 56 is increased the friction between the washer 56 and the mounting portion 22 of the perch assembly 18 is increased.

A plurality of elastic bands 62 is coupled to the support assembly 16 such that rotation of the perch assembly 18 with respect to the support assembly 16 facilitates winding of the elastic bands 62 between the perch assembly 18 and the support assembly 16. The elastic bands 62 unwinding upon ceasing of rotation of the perch assembly 18 such that the elastic bands 62 facilitate reversal of rotation of the perch assembly 18 with respect to the support assembly 16.

In an embodiment the present invention can be mounted to a support structure 14 for a bird 20 to perch upon, the bird perch apparatus; a mounting assembly 12 that is adapted to be coupled to a support structure 14. A support assembly 16 is rotatably coupled to the mounting assembly 12. A perch assembly 18 is rotatably coupled to the support assembly 16 such that the perch assembly 18 is adapted for permitting perching of the bird 20. The perch assembly 18 has a mounting portion 22 is coupled to the support assembly 16. The perch assembly 18 has a pair of annular rings 24 that are diametrically coupled to the mounting portion 22 such that each of the annular rings 24 is adapted for permitting perching of the bird 20.

The mounting assembly 12 includes a clasp portion 64 and a cord 66 such that the cord 66 is adapted for is coupled to a tree limb. The clasp portion 64 removably engages the cord 66 for permitting selective removal of the clasp portion 64 from the tree limb.

The support assembly 16 includes a support ring 68 and a support strap 70. The support ring 68 is rotatably coupled to the mounting assembly 12. The support strap 70 is extended through the support ring 68 such that each of a pair of opposing ends of the support strap 70 are coupled to diametrically opposed apertures of the mounting portion 22 of the perch assembly 18. The support ring 68 is for permitting rotation of the perch assembly 18 in respect to the mounting assembly 12.

The support strap 70 has a first portion 72 and a second portion 74. The first portion 72 is secured to the second portion 74 below the support ring 68 for preventing tipping of the perch assembly 18 when the bird 20 is perched upon the perch assembly 18.

A feeding assembly 76 is suspended from the mounting portion 22 of the perch assembly 18 such that the feeding assembly 76 is adapted for permitting the bird 20 to feed on birdseed. The feeding assembly 76 has a strap member 77 and a dish portion 78. The strap member 77 is coupled to the mounting portion 22 of the perch assembly 18. The strap member 77 is for suspending the dish portion 78 from being struck by the perch assembly 18 when another bird 20 lands upon the perch assembly, the dish portion 78 is adapted for holding bird seed. A perching member 79 is coupled between the dish portion 78 and the strap member 77 such that the perching member 79 is adapted for permitting the bird 20 to perch while eating birdseed from the dish portion 78.

In use, a user would attach the unit with the vide mount to the roof of the bird's cage. When the bird jumps on the present invention, it would spin in a circle, enabling the bird to spin horizontally and vertically at the same time.

FIGS. 7A–12 illustrate an alternate preferred embodiment of Applicants novel bird cage and perch assembly 111. Applicants' novel bird cage 110, in this preferred embodiment, provides a perch assembly 111 that may engage on top of a bird cage 110 and also either on the bottom of the bird cage 110 or, through struts or cross brace the sidewalls of a bird cage 110. The function of engaging both the top and the bottom of a perch assembly 111 is so that it may rotate longitudinally on its axis A stabilized by engagement at two points-typically representing removed ends of a frame 112 of the perch assembly 111. This may provide a more rigid and pleasant perch assembly 111 for the birds 20. Features additional to the top and bottom engagement points of the perch assembly 111 are set forth in more detail below.

Figure 7A:
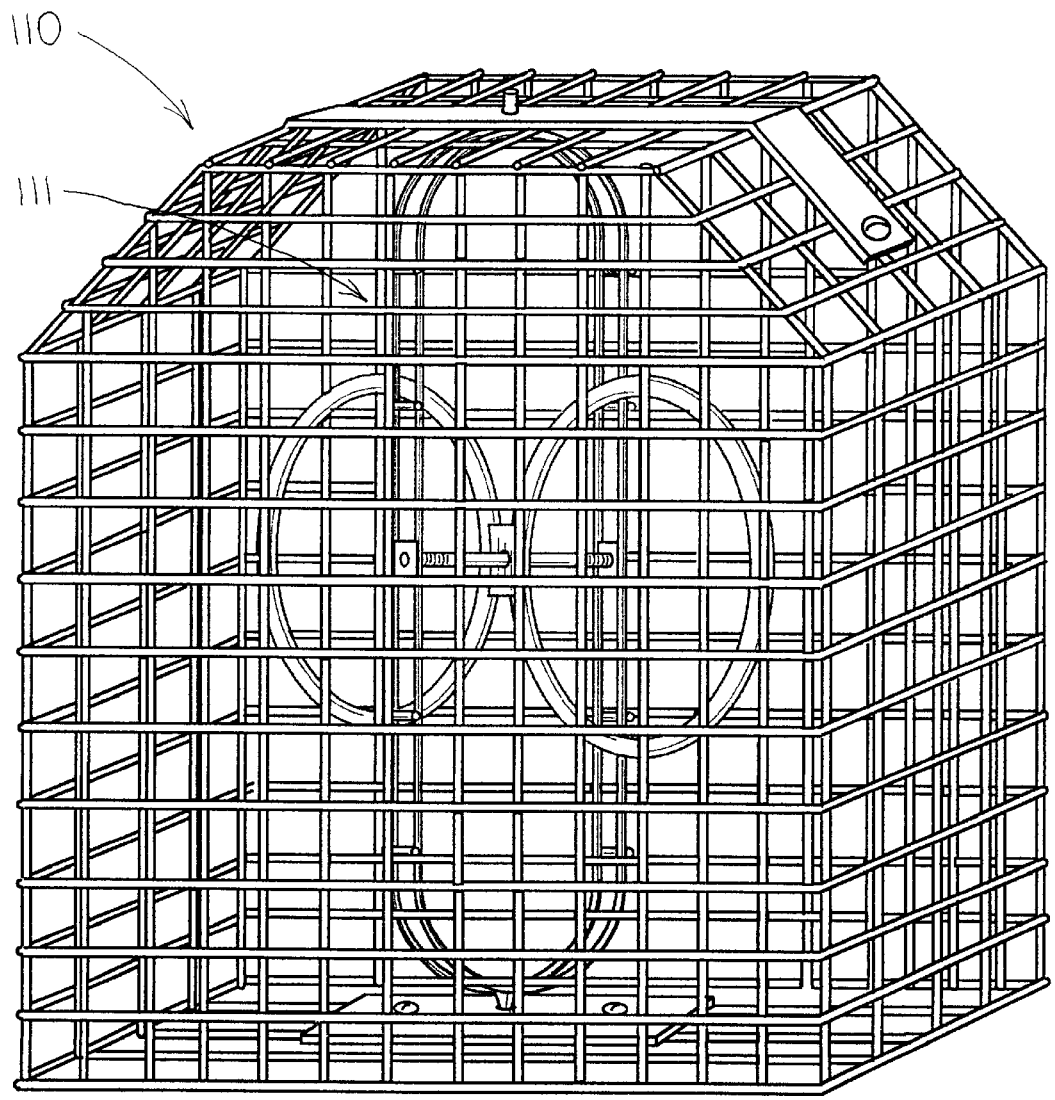
FIG. 7A is a perspective view of the present invention of an alternate preferred embodiment attached to the bird cage.
Figure 7B:
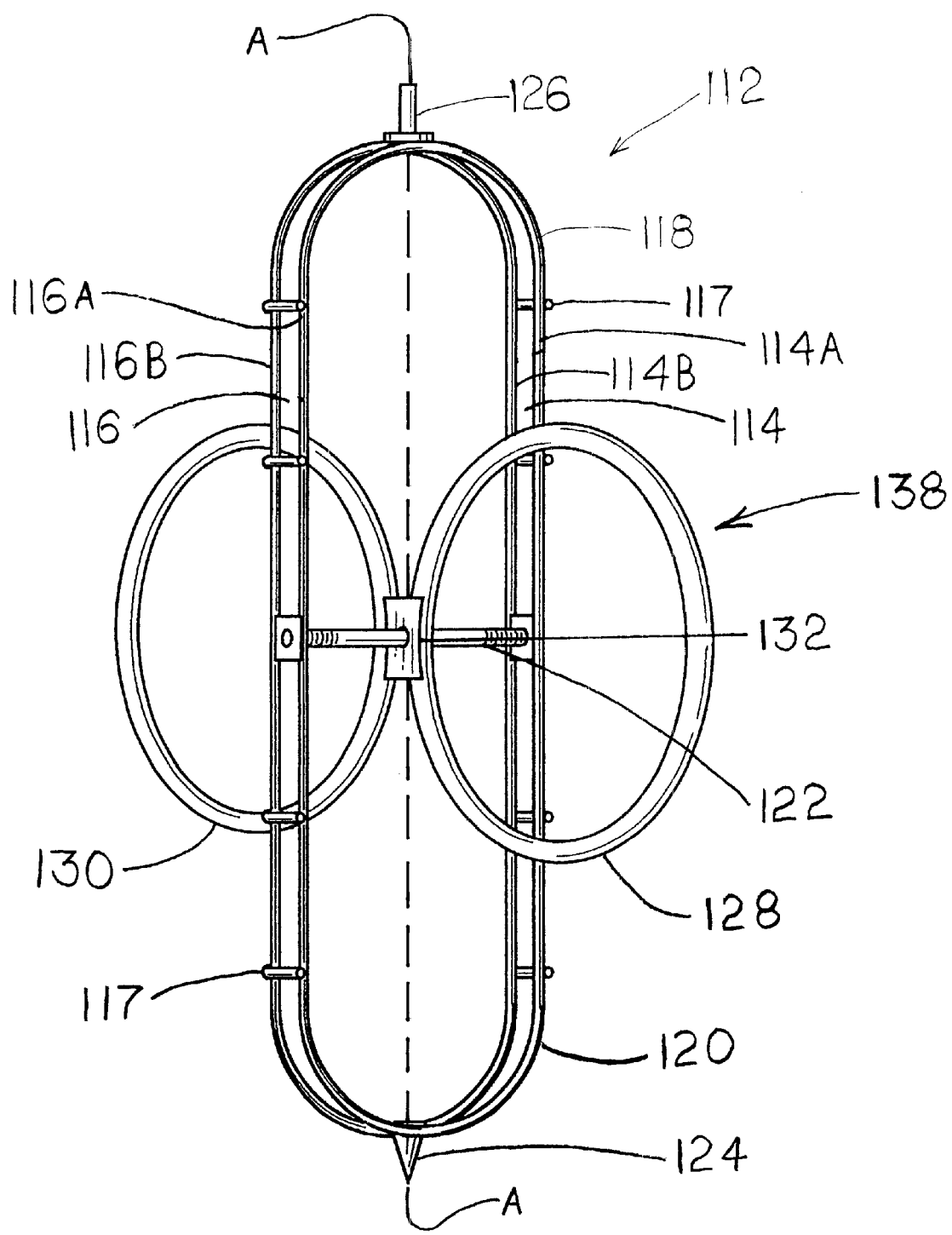
FIG. 7B is a perspective view of the present invention in an alternate preferred embodiment.

FIGS. 7A and 7B illustrate a bird cage 110 including a perch assembly 111. The perch assembly 111 includes a frame 112 and means for mounting the frame along a longitudinal axis A thereof to the top of the bird cage 110 and neither bottom or sidewall of the bird cage 110. Frame 112 of the perch assembly 111 includes opposed longitudinally trending side members 114 and 116 spaced apart and connected through upper member 118 and lower member 120. The members comprising frame 112 may include longitudinal rods 114A and 114B comprising side member 114 and longitudinal rods 116A and 116B comprising side member 116. In the embodiment using side members comprising a pair of longitudinal rods, the upper 118 and lower 120 members may likewise comprise extensions of the longitudinal rods of the side members 114A&B and 116A&B. Note also when longitudinal rods 114A&B and 116A&B are utilized to comprise frame 112 a multiplicity of cross pieces 117 may be provided to maintain the longitudinal rods 114A&B and 116A&B in space apart relation and, further more provide a convenient place for birds 20 to perch.

A horizontal support member 122 is seen to cross horizontally between side members 114 and 116. The horizontal support member 122 typically engages a perch mount 138, here illustrated with a pair of annular members including the first annular member 128 and a second annular member 130 spaced apart and rigidly joined by a mounting portion 132, which mounting portion 132 rotatably engages horizontal support member 122 near the center thereof so that the perch mount 138 may rotate about the axis defined by the horizontal support member 122.

Note that the two annular members 128 and 130 may rotatably engage mounting portion 132 to provide yet another axis of rotation, that is the rotation of the annular members 128 and 130 with respect to the mounting portion 132.

The frame 112 includes upper vertical support member 126 and lower vertical support member 124, the two vertical support members coincident with a longitudinal axis A of frame 112 in representing rejections up and down respectively from upper member 118 and lower member 120.

Figure 8A:
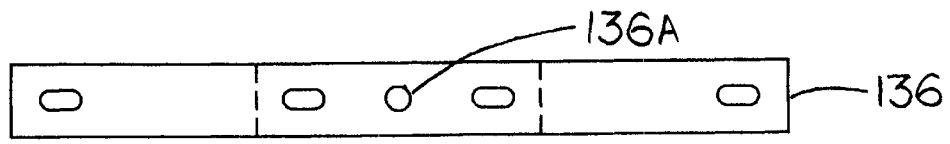
FIG. 8A is a top plan view of the upper mounting plate of the present invention in an alternate preferred embodiment.
Figure 8B:
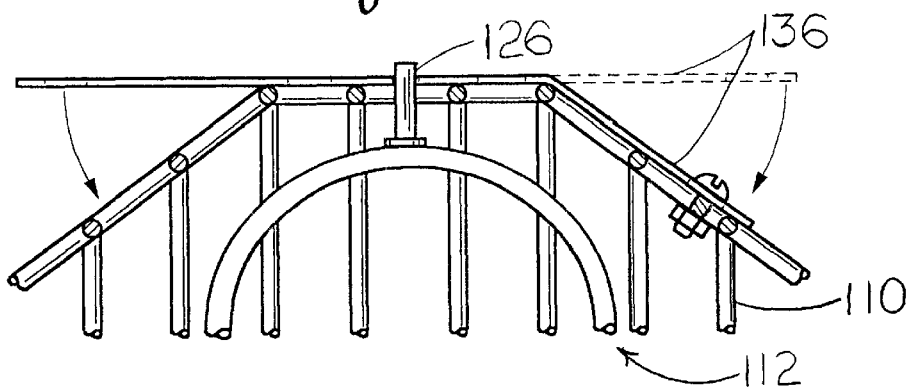
FIG. 8B is a partial front elevational view of the upper mounting plate of the present invention in an alternate preferred embodiment attached to the frame.

Turning now to FIGS. 8A and 8B it is seen that an upper mounting plate 136 with a hole or concavity or depression 136A near a central portion thereof may engage the top of bird cage 110 and the frame 112 so as to allow the frame 112 to rotate along a longitudinal axis A while being fastened to the bird cage 110 at the top and the bottom of the frame 112. Details of mounting plate 136, typically made of metal which can be straight or bent. A straight mounting plate 136 may be used to mount the frame 112 to a bird cage 110 that has a flat roof. However, if the upper mounting plate 136 is made of metal it may be bent such as illustrated in FIG. 8B to conform to the top of a bird cage 110 that is not flat. In either case the upper mounting plate 136 may use fasteners or any other suitable means to engage it with the top of the bird cage 110. Note that hole 136A would have a diameter slightly greater than a diameter of the upper vertical support member 126 so that the frame 112 may freely rotate.

Figure 9B:
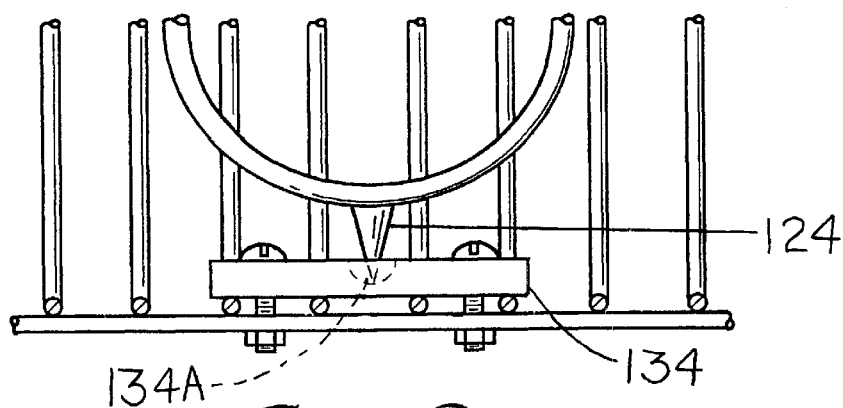
FIG. 9B is a partial front elevational view of the lower mounting plate of the present invention in an alternate preferred embodiment attached to the frame.
Figure 9A:
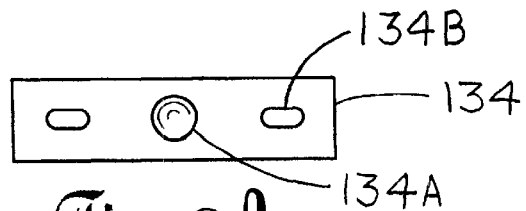
FIG. 9A is a bottom plan view of the lower mounting plate of the present invention in an alternate preferred embodiment.

Turning now to a means for rotatably mounting frame 112 of the perch assembly 111 to the bottom or the sidewalls of the bird cage 110, attention is drawn to FIGS. 9A and 9B. FIG. 9A illustrates a top view of a lower mounting plate 134 which has attachment slots or holes 134B for accepting fasteners to attach the lower mounting plate 134 to the frame 112 of a bird cage 110. Additionally, it is seen that in the central portion of the lower mounting plate 134 is a hole or depression or concavity 134A. The lower mounting plate 134 is attached to the frame 112 such that the concavity 134A will accept the lower vertical support member 124 which may be pointed or have a rounded end so that it may pivot with respect to the lower mounting plate 134.

Figure 10:
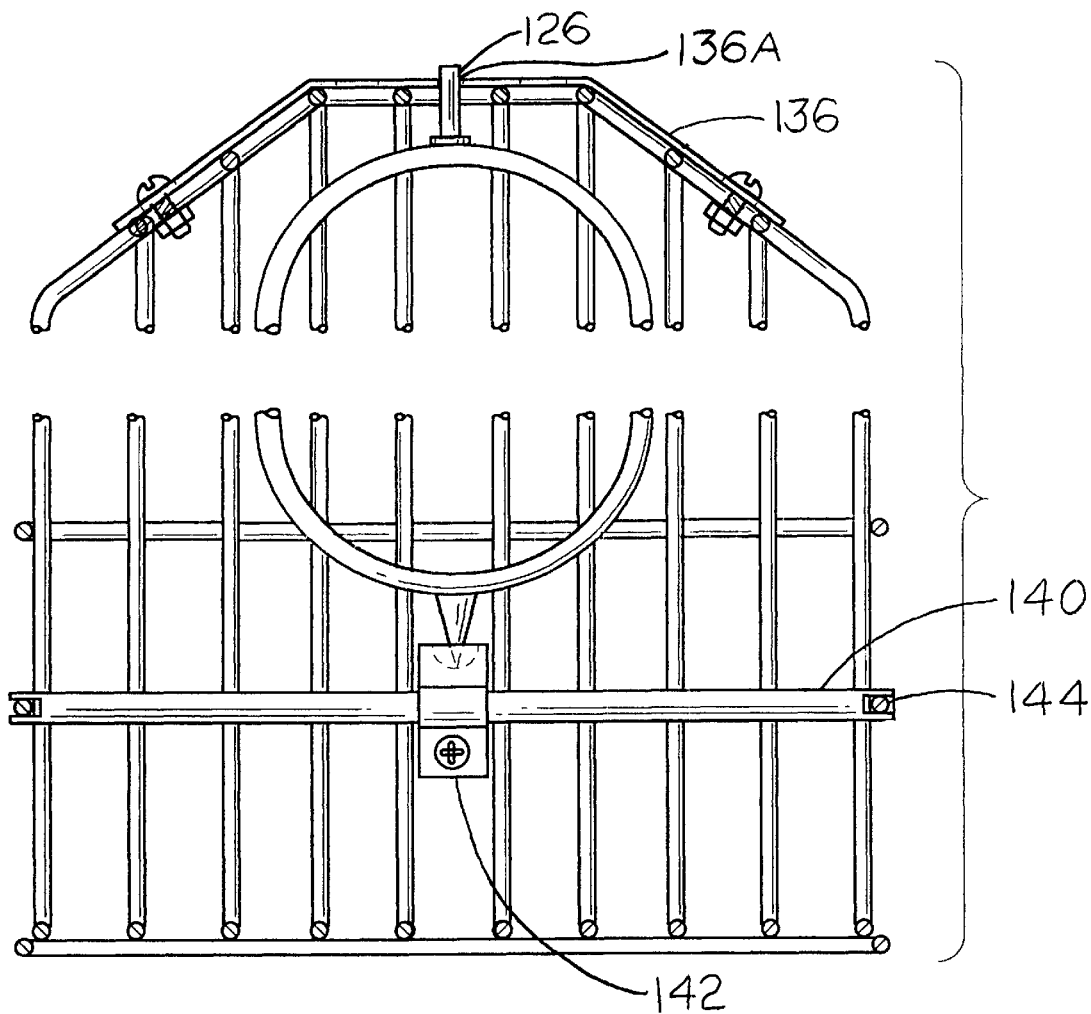
FIG. 10 is a broken front elevational view of upper mounting plate and the lower support clamp attached to the cross bar of the present invention in a second alternate preferred embodiment.
Figures 11, 12:
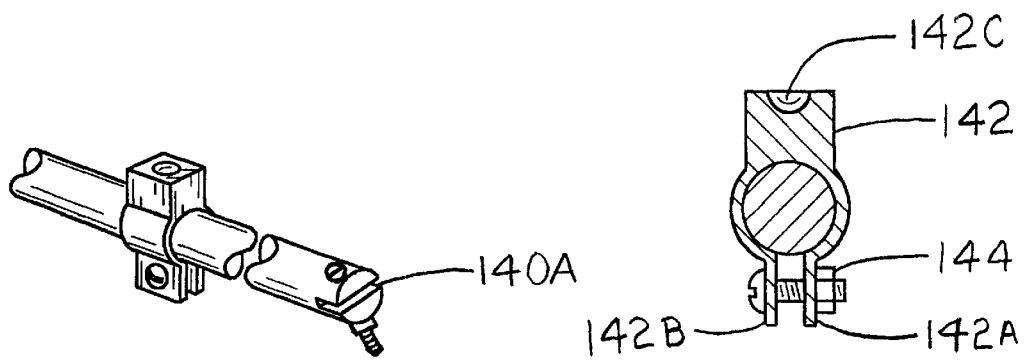
FIG. 11 is a perspective view of the lower support clamp attached to the cross bar of the present invention in a second alternate preferred embodiment.
FIG. 12 is a cross-sectional view of the lower support clamp attached to the cross bar of the present invention in a second alternate preferred embodiment.

If the dimensions of the bird cage 110 is such that frame 112 is not located near or adjacent the bottom of the bird cage 110, Applicant provides yet another preferred embodiment of the invention to allow frame 112 to connect to the lower vertical support member 124. Instead of a lower mounting plate 134 attached to the floor of the bird cage 110, a lower support clamp 142 which is attached to a cross bar 140 is provided. The cross bar 140 engages, at the removed ends thereof, the sidewalls of the bird cage 110 as illustrated in FIG. 10. Further it is seen that lower support clamp 142 has a pair of legs 142A and 142B that allows it to slidably mount to the cross bar 140 so that it may be positioned beneath lower vertical support member 124. Fastener 144 may be loosened to allow the legs 142A and 142B to open slightly and clamp to slide longitudinal along the cross bar 140. Lower support clamp 142 has a hole or depression or concavity 142C which will accept lower vertical support member 124 therein moreover the removed ends of cross bar 140 may be slotted with slots 140A, the slots 140A for receiving vertical members of the sidewalls of a bird cage 110 and fasteners 144 for engagement with the slotted ends to adjustably secure the cross bar 140 vertically at a preselected, position such that the upper vertical support member 126 engages the hole 136A of the upper mounting plate 136 and the lower vertical support member 124 engages lower support clamp 142.

We claim:

1. A perch assembly for use with a bird cage, the perch assembly comprising:
    a frame having a longitudinal axis, opposed side bar members and upper and lower members connecting the side bar members;
    a horizontal support member connecting the opposed side bar members;
    a lower vertical support member extending downward from the lower member of the frame, coincident with the longitudinal axis of the frame;
    an upper vertical support member extending upward from the upper member of the frame, coincident with the longitudinal axis of the frame; and
    a means for mounting the frame to the bird cage such that it rotates on the longitudinal axis thereof.

2. The perch assembly of claim 1 wherein:
    the mounting means includes a first engaging means for coupling the lower vertical support member with the bird cage to allow the frame to rotate on its longitudinal axis; and
    a second engaging means for coupling the upper vertical support member with the bird cage to allow the frame to rotate on its longitudinal axis.

3. The perch assembly of claim 2 wherein the second engaging means includes a plate for receiving the upper vertical support member therein.

4. The perch assembly of claim 3 wherein the plate is capable of being bent to conform to a shape of the bird cage.

5. The perch assembly of claim 2 further including a perch mount for engaging the horizontal support member.

6. The perch assembly of claim 1 further including a perch mount for engaging the horizontal support member.

7. The perch assembly of claim 6 wherein the perch mount includes a rotation engaging means for rotatably coupling the horizontal support member.

8. The perch assembly of claim 7 wherein the perch mount includes at least one annular ring.

9. The perch assembly of claim 7 wherein the perch mount includes a pair of diametrically opposed annular rings.

10. The perch assembly of claim 7 wherein the perch mount is made of molded plastic.

11. The perch assembly of claim 7 wherein the means for mounting includes means for engaging a bottom surface of the bird cage.

12. The perch assembly of claim 7 wherein the mounting means includes an engaging means cooperating with the side wall of a bird cage.

13. The perch assembly of claim 6 wherein the means for mounting include means for engaging a bottom surface of a bird cage.

14. The perch assembly of claim 6 wherein the mounting means includes an engaging means cooperating with a side wall of the bird cage.

15. The perch assembly of claim 1 wherein the side bar members include a pair of parallel longitudinal rods connected with cross pieces.

16. The perch assembly of claim 1 wherein the mounting means includes an engaging means for coupling the frame with a bottom surface of the bird cage.

17. The perch assembly of claim 16 wherein means for engaging includes a plate mounted to the bottom surface of the bird cage for rotatably receiving the lower vertical support member.

18. The perch assembly of claim 1 wherein the mounting means includes an engaging means cooperating with a side wall of the bird cage.

19. The perch assembly of claim 18 wherein the engaging means includes a bar extending from one side wall to an opposite side wall, the bar capable of being positioned below the lower vertical support member.

20. The perch assembly of claim 1 wherein means for mounting the frame includes means for selectively positioning the frame vertically in the bird cage.

* * * * *